US006753883B2

(12) United States Patent
Schena et al.

(10) Patent No.: US 6,753,883 B2
(45) Date of Patent: *Jun. 22, 2004

(54) PRINTED MEDIUM ACTIVATED INTERACTIVE COMMUNICATION OF MULTIMEDIA INFORMATION, INCLUDING ADVERTISING

(75) Inventors: Robert J. Schena, Wayne, PA (US); Mike E. Anderer, Salt Lake City, UT (US); Peter B. Ritz, Meadowbrook, PA (US); Mike Bernstein, Tucson, AZ (US)

(73) Assignee: Airclic Inc., Newtown, PA (US)

( * ) Notice: Subject to any disclaimer, the term of this patent is extended or adjusted under 35 U.S.C. 154(b) by 130 days.

This patent is subject to a terminal disclaimer.

(21) Appl. No.: 10/075,158

(22) Filed: Feb. 14, 2002

(65) Prior Publication Data

US 2002/0075298 A1 Jun. 20, 2002

Related U.S. Application Data

(63) Continuation of application No. 09/236,176, filed on Jan. 25, 1999, now Pat. No. 6,448,979.

(51) Int. Cl.[7] .................................................. G09G 5/00
(52) U.S. Cl. ........................ 345/741; 345/733; 345/716; 345/742; 345/854; 709/201; 709/207
(58) Field of Search ................................. 345/700, 733, 345/854, 741, 762, 742, 716, 717, 718, 738, 748; 709/201, 217, 219; 715/500.1, 501.1, 512

(56) References Cited

U.S. PATENT DOCUMENTS 4,042,113 A   8/1977   Duncan et al.
4,752,675 A   6/1988   Zetmeir 4,797,818 A   1/1989   Cotter (List continued on next page.)

FOREIGN PATENT DOCUMENTS

EP   856812 A2   8/1998
EP   856812 A3   5/1999

(List continued on next page.)

OTHER PUBLICATIONS

Anon, "The Dallas Morning News is Internet–enhanced," [online], [retrieved on Mar. 13, 2001]. Retrieved from the Internet: <URL:http://www.dallasnews.com/slideshow/crqguide/guide.html>.

(List continued on next page.)

Primary Examiner—Raymond J. Bayerl
Assistant Examiner—Cuong T. Thai
(74) Attorney, Agent, or Firm—Morgan Lewis & Bockius LLP

(57) ABSTRACT

The present invention describes a revolutionary new device bridging the gap between the virtual multimedia-based Internet world and the real world, best exemplified by print media. More particularly, the invention relates to communicating multimedia information using a scanner for machine-readable code containing a link information corresponding to a provider information depicted on the printed medium, a user interface for obtaining user input information corresponding to the provider information, a communications bridge for sending the link information and the user input information via the network, a receiver in communication with the scanner, capable of receiving the link information and user input information, and further capable of receiving and playing a multimedia information sequence, and a portal server in communication with the scanner via the network capable of selecting a multimedia information sequence corresponding to the link information and the user input information.

21 Claims, 4 Drawing Sheets

U.S. PATENT DOCUMENTS

| | | | |
|---|---|---|---|
| 4,964,043 A | 10/1990 | Galvin | |
| 5,122,959 A | 6/1992 | Nathanson et al. | |
| 5,237,157 A | 8/1993 | Kaplan | |
| 5,278,396 A | 1/1994 | McGaha | |
| 5,434,394 A | 7/1995 | Roach et al. | |
| 5,444,444 A | 8/1995 | Ross | |
| 5,478,989 A | 12/1995 | Shepley | |
| 5,496,071 A | 3/1996 | Walsh | |
| 5,539,635 A | 7/1996 | Larson, Jr. | |
| 5,583,487 A | 12/1996 | Ackerman et al. | |
| 5,583,994 A | 12/1996 | Rangan | |
| 5,611,051 A | 3/1997 | Pirelli | |
| 5,624,265 A * | 4/1997 | Redford et al. | 434/307 R |
| 5,625,776 A | 4/1997 | Johnson | |
| 5,630,125 A | 5/1997 | Zellweger | |
| 5,640,193 A | 6/1997 | Wellner | |
| 5,657,222 A | 8/1997 | Randolph | |
| 5,664,110 A | 9/1997 | Green et al. | |
| 5,694,551 A | 12/1997 | Doyle et al. | |
| 5,696,898 A | 12/1997 | Baker et al. | |
| 5,715,314 A | 2/1998 | Payne | |
| 5,761,499 A | 6/1998 | Sonderegger | |
| 5,804,803 A | 9/1998 | Cragun et al. | |
| 5,825,002 A | 10/1998 | Roslak | |
| 5,832,457 A | 11/1998 | O'Brien et al. | |
| 5,848,413 A | 12/1998 | Wolff | |
| 5,860,068 A | 1/1999 | Cook | |
| 5,869,819 A | 2/1999 | Knowles et al. | |
| 5,872,588 A | 2/1999 | Aras et al. | |
| 5,890,136 A | 3/1999 | Kipp | |
| 5,893,910 A | 4/1999 | Martineau et al. | |
| 5,899,700 A | 5/1999 | Williams et al. | |
| 5,905,248 A * | 5/1999 | Russell et al. | 235/462.15 |
| 5,905,251 A | 5/1999 | Knowles | |
| 5,907,836 A | 5/1999 | Sumita et al. | |
| 5,913,210 A | 6/1999 | Call | |
| 5,918,211 A | 6/1999 | Sloan | |
| 5,930,768 A | 7/1999 | Hooban | |
| 5,933,829 A | 8/1999 | Durst et al. | |
| 5,938,727 A | 8/1999 | Ikeda | |
| 5,940,074 A * | 8/1999 | Britt et al. | 345/749 |
| 5,940,595 A | 8/1999 | Reber et al. | |
| 5,950,173 A | 9/1999 | Perkowski | |
| 5,956,483 A | 9/1999 | Grate et al. | |
| 5,957,695 A * | 9/1999 | Redford et al. | 434/307 R |
| 5,963,916 A | 10/1999 | Kaplan | |
| 5,966,440 A | 10/1999 | Hair | |
| 5,969,324 A | 10/1999 | Reber et al. | |
| 5,970,469 A | 10/1999 | Scroggie et al. | |
| 5,974,222 A | 10/1999 | Yuen et al. | |
| 5,978,773 A | 11/1999 | Hudetz et al. | |
| 5,979,757 A | 11/1999 | Tracy et al. | |
| 5,983,199 A * | 11/1999 | Kaneko | 705/26 |
| 5,987,440 A * | 11/1999 | O'Neil et al. | 705/44 |
| 5,991,737 A | 11/1999 | Chen | |
| 5,992,752 A | 11/1999 | Wilz, Sr. et al. | |
| 5,995,105 A | 11/1999 | Reber et al. | |
| 6,006,242 A * | 12/1999 | Poole et al. | 715/531 |
| 6,006,252 A | 12/1999 | Wolfe | |
| 6,011,949 A | 1/2000 | Shimomukai | |
| 6,012,102 A | 1/2000 | Shachar | |
| 6,026,375 A | 2/2000 | Hall et al. | |
| 6,027,024 A | 2/2000 | Knowles | |
| 6,029,141 A | 2/2000 | Bezos et al. | |
| 6,031,621 A * | 2/2000 | Binder | 358/1.1 |
| 6,032,130 A | 2/2000 | Alloul et al. | |
| 6,032,195 A | 2/2000 | Reber et al. | |
| 6,034,680 A * | 3/2000 | Kessenich et al. | 345/733 |
| 6,038,552 A | 3/2000 | Fleischl et al. | |
| 6,045,048 A | 4/2000 | Wilz, Sr. et al. | |
| 6,049,835 A | 4/2000 | Gagnon | |
| 6,064,979 A | 5/2000 | Perkowski | |
| 6,076,733 A | 6/2000 | Wilz, Sr. et al. | |
| 6,101,483 A | 8/2000 | Petrovich et al. | |
| 6,123,259 A | 9/2000 | Ogasawara | |
| 6,134,548 A | 10/2000 | Gottsman et al. | |
| 6,137,950 A | 10/2000 | Yuen | |
| 6,144,848 A | 11/2000 | Walsh et al. | |
| 6,148,331 A | 11/2000 | Parry | |
| 6,152,369 A | 11/2000 | Wilz, Sr. et al. | |
| 6,154,738 A | 11/2000 | Call | |
| 6,160,989 A | 12/2000 | Hendricks et al. | |
| 6,199,048 B1 | 3/2001 | Hudetz et al. | |
| 6,233,682 B1 | 5/2001 | Fritsch | |
| 6,246,997 B1 | 6/2001 | Cybul et al. | |
| 6,263,313 B1 | 7/2001 | Milsted | |
| 6,311,214 B1 | 10/2001 | Rhoads | |
| 6,356,905 B1 | 3/2002 | Gershman et al. | |
| 6,384,744 B1 | 5/2002 | Philyaw et al. | |
| 6,412,695 B1 | 7/2002 | Reber et al. | |
| 6,463,585 B1 | 10/2002 | Hendricks et al. | |
| 6,484,943 B1 | 11/2002 | Reber et al. | |
| 6,542,933 B1 | 4/2003 | Durst, Jr. et al. | |
| 2001/0011233 A1 | 8/2001 | Narayanaswami | |
| 2001/0013011 A1 | 8/2001 | Day et al. | |
| 2001/0014868 A1 | 8/2001 | Herz et al. | |
| 2001/0027472 A1 | 10/2001 | Guan | |
| 2001/0032251 A1 | 10/2001 | Rhoads et al. | |
| 2002/0062261 A1 | 5/2002 | Mukai | |
| 2003/0019935 A1 | 1/2003 | Giannulli | |

FOREIGN PATENT DOCUMENTS

| | | |
|---|---|---|
| WO | WO 9526536 | 10/1995 |
| WO | WO 97/01137 | 1/1997 |
| WO | WO 9701137 | 9/1997 |
| WO | 98/20411 | 5/1998 |
| WO | WO 9916060 | 1/1999 |
| WO | WO 99/16060 | 4/1999 |
| WO | WO 9917230 | 4/1999 |
| WO | 01/35410 | 5/2001 |
| WO | 02/44956 | 6/2002 |

OTHER PUBLICATIONS

Anon, "Welcome Parade Readers, Digital Convergence," [online], [retrieved on Mar. 13, 2001]. Retrieved from the Internet: <URL:http://www.getcuecat.com/welcome/index.html>.

Anon, "The Cue Cat," [online], [retrieved on Mar. 13, 2001]. Retrieved from the Internet: <URL:http://www.forbes.com/helpcenter/cat/>.

Anon, "Changing the Way Your Surf The Internet," [online], [retrieved on Apr. 23, 2001]. Retrieved from the Internet: <URL:http://www.crg.com/index.html>.

Anon, "Welcome to Digital Convergence," [online], [retrieved on Oct. 15, 2001]. Retrieved from the Internet: <URL:http://www.crg.com/master-templ.cfm?view=home>.

Anon, "Cross Convergence," [online], [retrieved on Apr. 31, 2001]. Retrieved from the Internet: <URL:http://www.cross-.com/cross/conv-faq.html>.

Anon, "Who Are We," [online], [retrieved on Apr. 23, 2001]. Retrieved from the Internet: <URL:wysiwyg://parent.26/http://www.jumptech.com/who.html>.

Anon, "DTI Announces SpeedURL:A new, patent-pending solution for linking print and the Internet," [online], [retrieved on Mar. 14, 2002]. Retrieved from the Internet: <URL:http://www.dtint.com/dtint/pagespeed/url/speedurl>.

Anon, "Managing Director of Leading Dutch Publishers Joins Jumptech Board," [online], Nov. 20, 2000 [Retrieved on Jun. 5, 2002]. Retrieved from the Internet: <URL:http://jumptech.com/pages/news/pr–11–20–2000.html>.

Anon, "Jumptech.com's Print–to–Internet Technology Allows Dutch Publisher to Develop Internet–Enabled Newspaper," [online], Aug. 28, 2000 [retrieved on Jun. 5, 2002]. Retrieved from the Internet: <URL:http://jumptech.com/pages/news/pr–8–28–2000.html>.

Anon, "Octel Communications Offers a Multi–Function Call Processing Server System," Computergram International, No. 1658, Apr. 19, 1991.

Vollum, R.B., "43 Ways Computers Can Help You" (Abstract only), Purchasing World, vol. 27, No. 6, pp. 81–82.

Anon, "MSNBC Business Video and Wave Phone Newscast Create Multimedia Business Intelligence Service," Information Today, vol. 15, No. 1., p. 25, Jan., 1998.

Majer, A., et al., New Media, vol. 9, No. 1, p. 11, published Jan., 1999.

Anon, "Financial Times Launches Content Through Netscapes In–Box Direct," Information Today, vol. 14, No. 3, pp. 1, 19, Mar. 1997.

Anon, "Gazette To Use Code in Colorado Springs," [online], Sep. 8, 2000. [Retrieved on Mar. 13, 2001]. Retrieved from the Internet: <URL:http://www.editorandpublisher.com/ephone/news/newshtm/stories/090800n2.htm>.

Anon, "Controversial Custom CD Patent Licensed by Super Sonic BOOM," Information Today, vol. 15, No. 5, p. 43, May 1998.

Anon, "Singapore: Vivamusic.com Opens Physical Store," Business Times, p. 12, Aug. 21, 2000.

Internet Number, www.hatch.co.jp/e, 34 pages.

Bango.Net, www.bango.net, 71 pages.

Vollum, R.B. "43 Ways Computers Can Help You," (Abstract only), Purchasing World. vol. 27, No. 6, pp. 81–82 Jun. 1983.

Anon., "Octel Communications Offers a Multi–Function Call Processing Server System," Computergram International, No. 1658, Apr. 19, 1991.

Anon., "Financial Times Launches Content Through Netscape's In–Box Direct," Information Today, vol. 14, No. 3, pp. 1, 19, Mar. 1997.

Anon, "MSNBC Business Video and WavePhore Newscast Create Multimedia Business Intelligence Service," Information Today, vol. 15, No. 1., p. 25+, Jan. 1998.

Majer, A. et al., NewMedia, vol. 9, No. 1, p. 11, published Jan. 1999.

www.dallasnews.com; "The Dallas Morning News Internet–Enhanced", pp. 1–7.

www.getcuecat.com; "Welcome Parade Readers"; Digital Convergence, p. 1.

www.forbes.com; "The Cue Cat", p. 1–2.

www.crq.com; "Changing the Way You Surf the Internet"; pp. 1–3.

www.crq.com; "Welcome to Digital Convergence"; pp. 1–5.

www.cross.com; "Cross Convergence", p. 1.

www.dtint.com; "DTI Announces Speed URL: A New Patent Pending Solution for Linking Print and the Internet", pp. 1–4.

www.editorandpublisher.com; "Gazette to Use Gocode in Colorado Springs"; Sep. 8, 2000; pp. 1–2.

www.jumptech.com; Who We Are; p. 1.

www.jumptech.com; JumpTech news release; "Managing Director of Leading Dutch Publisher Joins Jumptech Board"; Minneapolis, MN, Nov. 20, 2000; pp. 1–2.

www.jumptech.com; JumpTech news release; "Jumptech.com's Print–to–Internet Technology Allows Dutch Publisher to Develop Internet–Enabled Newspaper"; Minneapolis, MN, Aug. 28, 2001, p. 1.

* cited by examiner

PRINTED MEDIUM ACTIVATED INTERACTIVE COMMUNICATION OF MULTIMEDIA INFORMATION, INCLUDING ADVERTISING

This application is a continuation of application Ser. No. 09/236,176, files Jan. 25, 1999 now U.S. Pat. No. 6,448,979.

FIELD OF THE INVENTION

The present invention is a revolutionary new device for bridging the gap between the virtual multimedia-based Internet world and the physical world of print media. More particularly, the invention relates to communicating multimedia information across a network using a scanner capable of receiving data such as machine-readable code from a printed medium, the data containing a link information corresponding to a provider information; a receiver in communication with the scanner that is capable of receiving the link information and user input information, and of receiving and playing a multimedia information sequence from the network; and a portal server in communication with the scanner and the receiver via the network, the portal server being capable of selecting a multimedia information sequence corresponding to the link information and the user input information.

BACKGROUND OF THE INVENTION

Scanner technology has been used for many years in many contexts. By way of example, scanners are used in supermarkets, with personal computers, and in inventory, manufacturing, and resource control systems. However, scanner technology has not previously been thought of as a means to bridge the gap between static printed media and the "virtual world" of interactivity, which includes the Internet, advertising, entertainment, and electronic commerce.

Printed media have been the primary source of communicating information, including news and advertising information, for centuries. The-advent of the Internet over the past few decades has expanded the concept of printed media by making it available in an electronically readable and searchable form and by introducing interactive multimedia capabilities unparalleled by traditional printed media. Unfortunately, many users of printed media do not possess the requisite technical expertise to use the Internet as an efficient source of information. Thus, although almost everyone in the world has access to printed media on a daily basis, only a small percentage of those people possess the requisite technical expertise to use the Internet.

There exists a need for a system that can link all users of printed media to the "virtual world" and that can deliver desired information to the user without regard to the user's technical expertise. The present invention provides such a system by using scanner technology to bridge the gap between printed media and the virtual world of interactivity and the Internet. Moreover, such a system enables those controlling the print media to enhance their presentation of information to their customers by providing them with a multimedia experience unavailable in traditional printed media.

SUMMARY OF THE INVENTION

The present invention comprises a system for communicating multimedia information via a network, such as the Internet, an intranet, or an extranet, wherein the communication is initiated from a printed medium. The system includes a scanner, a receiver, and a portal server, all interconnected via the network. In one embodiment, the scanner and the receiver comprises a single device. In another embodiment, the scanner communicates with the portal server directly, and customer premises equipment ("CPE"), serving as the receiver, plays multimedia sequence information received from the portal server. In a further embodiment, the CPE operates as both a scanner and a receiver. The multimedia sequence information may be advertising or transaction information and may contain one or more of textual, audio, or video information.

In a preferred embodiment, the scanner includes a memory, a user interface, and a communications bridge. The scanner may be, for example, a remote control, a mouse, a cellular telephone, a personal digital assistant, a personal computer, a pager, or a two-way pager. The scanner detects and reads data, such as machine-readable codes containing link information corresponding to provider information from the printed medium. A plurality of codes may be stored in the scanner, the receiver, and the portal server. The link information corresponding to the provider information may include, for example, a universal resource locator, an Internet address information, trademark information, a source of origin, an organization name, a product name, a service name, benefit redemption information, provider defined information, user personal profile information, user interest information, server command information, and customer premises equipment preference information.

The user interface obtains user input information, such as an advertising authorization, a transaction authorization, user personal profile information, and user interest information corresponding to the provider information. The user input information may be received and stored by either the scanner, the receiver, or the portal server. The scanner routes the link information and the user input information based upon a user request via the user interface. The user interface may be, for example, a voice-activated system, a keypad, or a keyboard. In one embodiment, the user interface may reside on any one or more of the scanner, the receiver, such as customer premises equipment for displaying the multimedia sequence information, or the portal server.

The communications bridge sends the link information and the user input information to the receiver and, via the network, to the portal server. An infrared communications system, a mobile radio communications system, or an IP-based communications system are exemplary of the communications bridge.

The portal server is in communication with the scanner or the receiver via the network. In one embodiment, the portal server is accessible via the Internet to any Internet user. In another embodiment, the portal server is accessible only by the provider of information. The portal server is capable of receiving the link information and the user input information, selecting a multimedia information sequence corresponding to the link information and the user input information, and sending the multimedia information sequence via the network to the receiver. The portal server is further capable of tracking link information corresponding to a user, including a universal resource locator, Internet address information, a trademark information, a source of origin, an organization name, a product name, a service name, a benefit redemption information, a provider defined information, a user personal profile information, a user interest information, a server command information, and a customer premises equipment preference information. In a preferred embodiment, the portal server is further capable of tracking a percentage of a fee to be charged to the information provider based on, for example, the selected multimedia information sequence, the number and frequency of the link information received by the portal server corresponding to a particular information provider, or the transaction value in the event the selected multimedia information sequence generates a transaction. In another embodiment, the portal server is further capable of tracking a percentage of a fee to be charged to the information provider based on, for example, the selected multimedia information sequence and either of the user personal profile information or the user interest information. The portal server is further capable of auctioning the user interest information according to a user defined auction criteria in the user personal profile information to an information provider. The user personal profile information may be stored on the portal server.

The receiver is in communication with the scanner and the portal server, and is capable of receiving the link and user input information, receiving a multimedia information sequence, and playing the multimedia information sequence. The receiver may be a CPE, such as a television, a set top box, a computer, a cell telephone, a remote control, a personal digital assistant, an integrated PC-TV device (e.g. Web TV) or a pager.

DETAILED DESCRIPTION OF THE INVENTION

Figure 1:
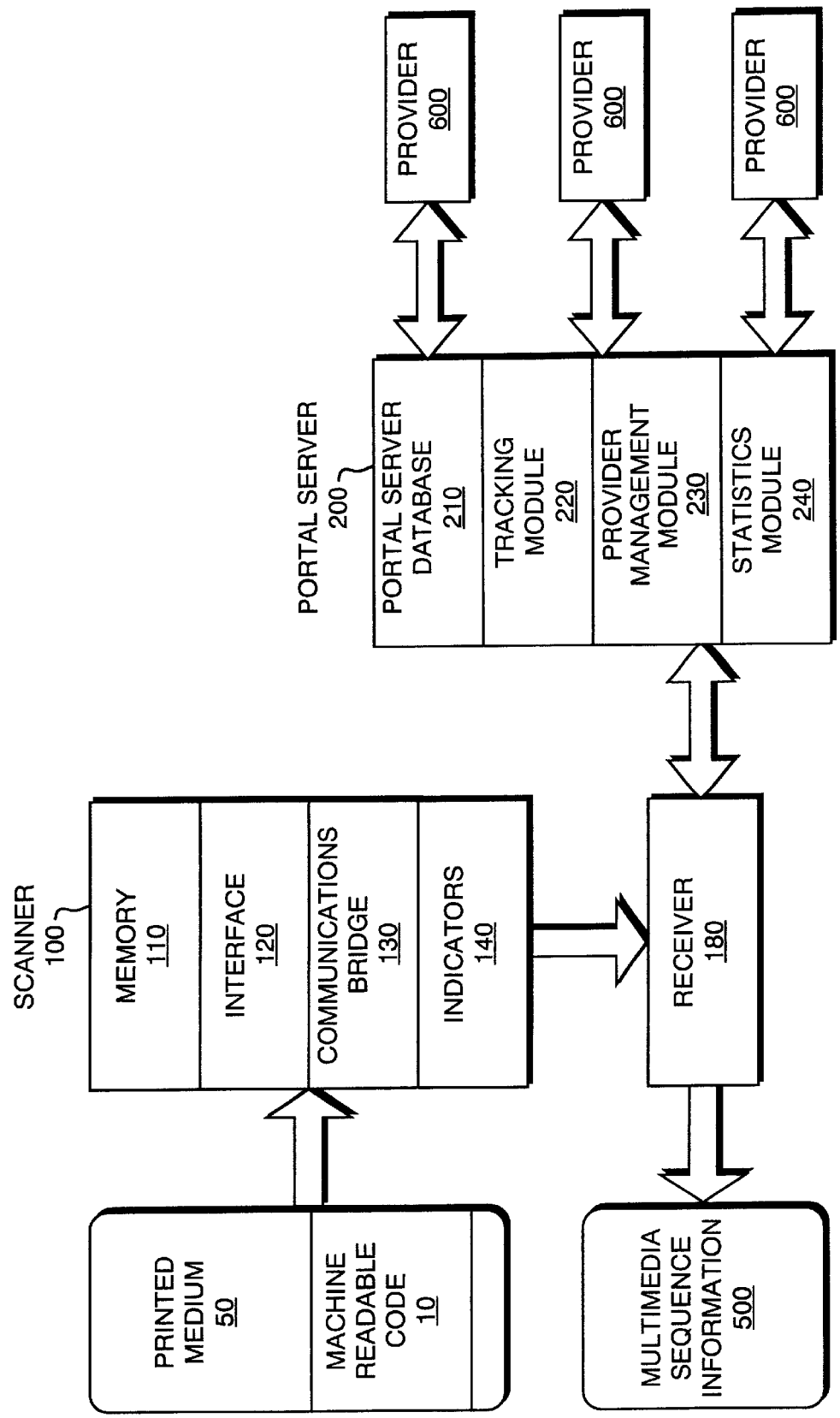
FIG. 1 depicts an embodiment of the present invention using a receiver to communicate with both a scanner and a portal server.

FIG. 1 depicts an embodiment of the present invention including three components: a scanner 100, a receiver 180, and a portal server 200. In one embodiment, the scanner 100 and the receiver 180 comprise into a single device. In another embodiment, the scanner 100 communicates with the portal server 200 directly, and a customer premises equipment ("CPE") 300, serving as the receiver 180, plays multimedia sequence information received from the portal server 200.

The scanner 100 may be a handheld device, preferably, but not necessarily, wireless. The scanner 100 may be, for example, an enhanced existing electronic device, a TV remote control, a mouse, a cell phone, a PC card device, a palmtop, a calculator, a key chain, a pen, an identification card, a smart card, a hand held GPS device, a desktop or laptop computer, a digital appliance, a microprocessor-based device., a personal digital assistant, a pager or a two-way pager.

The scanner 100 is capable of reading data such as non-coded data and machine-readable code 10 from the printed medium 50. The machine-readable code 10 may be a barcode, an enhanced barcode, a new enhanced code, or any type of code, including dynamic codes and high density barcodes.

The code 10 contains a link information corresponding to a provider information from a printed medium 50. The link information may correspond to a universal resource locator ("URL"), an Internet address information, network address information, a trademark information, a source of origin, an organization name, a product name, a service name, a benefit redemption information, a provider defined information, a user personal profile information (i.e., "a cookie"), a user interest information, a server command information, and a customer premises equipment preference information.

The link information may be an alphanumeric sequence printed in form of the machine-readable code 10. The alphanumeric sequence may be assigned to the printed medium 50 by the provider 600 and may be encoded according to the provider's 600 preference. The alphanumeric sequence may activate and result in the playing of the multimedia sequence information 500. For example, a machine-readable code 10 on the printed advertisement for an automobile may translate into the following alphanumeric sequence "A001B0990799A5557ZQZ6898". The "A001" designation may correspond to a template on the scanner 100 enabling Ford to present a person with a user input information asking whether the person is interested in advertisements, transactions, or both. The "B099" designation may refer to a type and name of the magazine which carried the ad. The "0799" designation may refer to July 1999 issue from advertiser A5557 which might be a local automobile dealer. The "ZQZ6898" designation may be the network code and could refer to a network address at the portal server 200 or to a link table. Existing UPC or ISBN numbers may serve as the alphanumeric sequence. At least one of the scanner 100, the receiver 180, or the portal server 200, may extract the provider information from such alphanumeric sequence and translate it into a network address at the portal server 200 or a link table.

The code 10 comprises at least one of the link information, and a publication information (i.e. where the information was published or located), along with a demographic and other advertising or message-specific information provided by a provider 600. The code 10 may also comprise personal and provider security information.

The system of the invention is also capable of collecting and managing code 10 that lacks link information This linkless code information may be added to the cookie along with any additional user input information. The code 10 is capable of being read by a scanner 100 or a transducer generating and transmitting the link information based upon a stimulus. The scanner 100 or transducer is capable of differentiating between information and data contained within code 10. One type of the code 10 may be an information-only type that would link to an information page. A simple example of this would be a scanned universal product code ("UPC") printed on a can of food linking a person using the system to the manufacturer's information on nutrition, recipe, or transaction information. The system can also process UPC codes by directing them to a link table to resolve the link without any added codes. The system is capable of processing the ISBN number codes, UPC codes and any codes currently in use.

More complex interactive codes could be routed based on any of the scanned information in combination with user personal profile information (i.e. "a cookie"), user interactive responses from the user input information, the person's location or other demographic information and a portal server database 210 information. The cookie comprises a person's identifying information such as name, address, credit card(s) information, and other related information. Cookies may be stored on the scanner 100, the receiver 180, or the portal server 200. Other information that may be combined with the code 10 includes executable code downloaded from the portal server 200 or provider 600, and user input information that could further supplement the scanned information from code 10 by eliciting an interactive response from the person using the system One exemplary code corresponds to reordering information such that a reordering of a product may be activated by scanning the code 10, recognizing it as a reorder, and maintaining a transaction via the portal server 200 such that a percentage of a fee for the reorder is maintained by a fee tracking module 220. In an embodiment, the fee is shared with the person placing the transaction. In another example, an HMO pharmacy could encode patient information, medication information, and refill information onto a printed label of medication upon its dispensing. The information would be represented by code 10. Scanner 100 would read the code 10 and validate the personal information contained in the code 10 against the user personal profile information stored on either the scanner 100, the receiver 180, the portal server 200, or a provider 600. Once the validation is complete, the system allows for secure transactions to proceed, including authenticated refills, recording the transaction and maintaining an accounting of a percentage of a fee for the refill using the tracking module 220.

The system of the present invention contemplates using additional code types such as phone numbers, business card, service information, benefit redemption information, rebate, coupon, literature, or any general information category of interest to a person or information provider 600. The information contained in the additional code types may be uploaded to the scanner 100, receiver 180, or portal server 200 once or sent locally or with cookie and security information from anywhere in the network. The processing of codes 10, including additional code types, may optionally but not necessarily be done at a time different from reading and scanning the printed medium 50. In a preferred embodiment, the scanner 100 generates and stores a code file in memory 110 representing a collection of codes scanned by the operator in any given time period. The scanner 100 uploads the coded file in memory 110 to the receiver 180 according to a user initiated stimulus. For example, a user may find four advertisements of interest in a printed medium 50, such as a magazine. The scanner 100 could read the four codes 10 from the magazine advertisements and store them in the memory 110. Subsequently, at a time convenient to the user, the user can upload the information to the receiver 180 for processing.

The information in the code 10 could be simple data or complex data-type-plus data, such as encoded, printed multimedia information. A UPC code is an example of simple data. The information used by the system can also be non-coded or raw. For example, a universal resource locator ("URL") is non-coded data, but when encoded as a URL-type code 10, the information in the code 10 may be processed.

The system uses unique code templates for interactivity which contain transaction information, authorization information, references to the publisher, media originator, ad placement, date of publication, dealer, reseller or distributor. The system is capable of tracking the scans according to the code types used in scanning these ads and collecting the demographics. The system is also capable of tracking and redirecting the usage of the codes 10 by different information providers 600 based on the content of the printed information. For example, a person scans an identifying code 10 related to a brand of computer. The computer manufacturer would like to direct the person to its information site. However, the person who performed the scan or portal server 200 that processed the scan, may choose to auction off the instance of the scan to a competitor, thereby allowing the competitor to bid for the right to transmit more information to the person about the competitor's comparable product or a transaction, such as user interest information.

The system of the invention can communicate with digital copyright databases bearing the code in tangible format. For example, an article that includes the code 10 may direct a person wanting to copy the article to the copyright database. The system is further capable of charging the person a fee and suggesting related articles based on the information in the code 10. The system can monitor the commercial, office, and copying equipment connected to the network that processes the code, and can then activate the access to the copyrighted materials database. In that context, the code serves as an intelligent watermark capable of carrying the article identifying information, distribution information, and fee related information.

Preferably, the code 10 features a small footprint, an attractive appearance, a high density of information, and ease of scanning. For example the footprint may be a triangle shaped code with a logo and an indicator of what type of code 10 it is (information, e-commerce, or both). The identifying characteristics of the presentation of the code 10 signify that the code is not an ordinary advertisement, but part of an enhanced information medium leading to multiple dimensions of multimedia information sequences 500.

The scanner 100 can transmit the code 10 to a receiver 180, such as a television, a set top box, a computer, a cell telephone, a remote control, a personal digital assistant, an integrated PC-TV device (e.g., Web TV), a pager or two-way pager, or directly to the portal server 200. The receiver 180 is in communication with a network, such as the Internet or other network, and can direct or link a person to a specific network address or site based on the machine-readable code or codes 10 contained in the scanned information from the printed medium 50.

For example, the provider information depicted on a printed medium 50 may be advertising information for an automobile. The manufacturer of the automobile would be provider 600. The link information in code 10 from the printed advertisement may include network address information, such as for example the manufacturer's web site. Processing the link information may result in playing a multimedia information sequence 500 on the receiver 180 provided by provider 600. Additionally or in the alternative, the network address information may point to a file containing executable computer code which could be downloaded or executed remotely then displayed on the receiver 180 or scanner 100. One or more link table(s) (not shown) may also be used to facilitate a two-way communication between the provider 600 and receiver 180. A link table containing network codes and associated network address information, for example, may be accessed to process link information containing only the network code. The link table associates the network code to a network address information to facilitate the connection between provider 600 and receiver 180. Link information may also be cascaded via the link table(s). Link tables may be located on or be accessible to the receiver 180, the portal server 200, or the provider 600. The machine-readable code 10 can also link the person directly to a specific Internet address without accessing a link table.

In a preferred embodiment, the scanner 100 includes a memory 110, a user interface 120, and a communications bridge 130.

The user interface 120 obtains user input information, such as an advertising authorization, a transaction authorization, a user personal profile information, and a user interest information corresponding to the provider information. The user input information may be received and stored in the scanner memory 110, the receiver 180, or the portal server 200. The scanner 100 routes the link information and the user input information based upon a user request via the user interface 120. The user interface 120 may be, for example, a voice-activated system, a keypad, or a keyboard. In one embodiment, the user interface 120 may reside on any one or more of the scanner 100, the receiver 180, such as a customer premises equipment ("CPE") 300 for displaying the multimedia sequence information 500, or the portal server 200.

The communications bridge 130 sends the link information and the user input information to the receiver 180 and, via the network, to the portal server 200. An infrared communications system, a mobile radio communications system, or an IP-based communications system are exemplary of the communications bridge.

The scanner 100 comprises a handheld component in a preferred embodiment. The handheld component may comprise an enhanced existing device like a TV remote control, a mouse, a cell phone, a REX device, a palmtop, a calculator, a key chain, a pen, an identification card, a smart card, a hand held global positioning system ("GPS") device, a desktop or laptop computer or virtually any other digital appliance or a microprocessor based device. The scanner 100 could be a proximity-based device that would activate a smart button, which is a device having a memory and a communicator to upload the information in the memory to a network, or a contact-based device. For example, scanner 100 may be either an optical scanner or a transducer, respectively. In a preferred embodiment, the scanner 100 has several modes, such as scan and process, scan and hold, and scan and display. The scanner 100 may also have a mode allowing copying of the code 10 for backup or review and edit. In another preferred embodiment, the scanner 100 may have a light and/or a sound indicator for confirming that a valid scan occurred. An embodiment may also have transmit and receive indicators 140 for confirming that a valid scan occurred. Optionally, the scanner 100 could communicate with another scanner 100 to exchange link, code, or cookie information.

Figure 2:
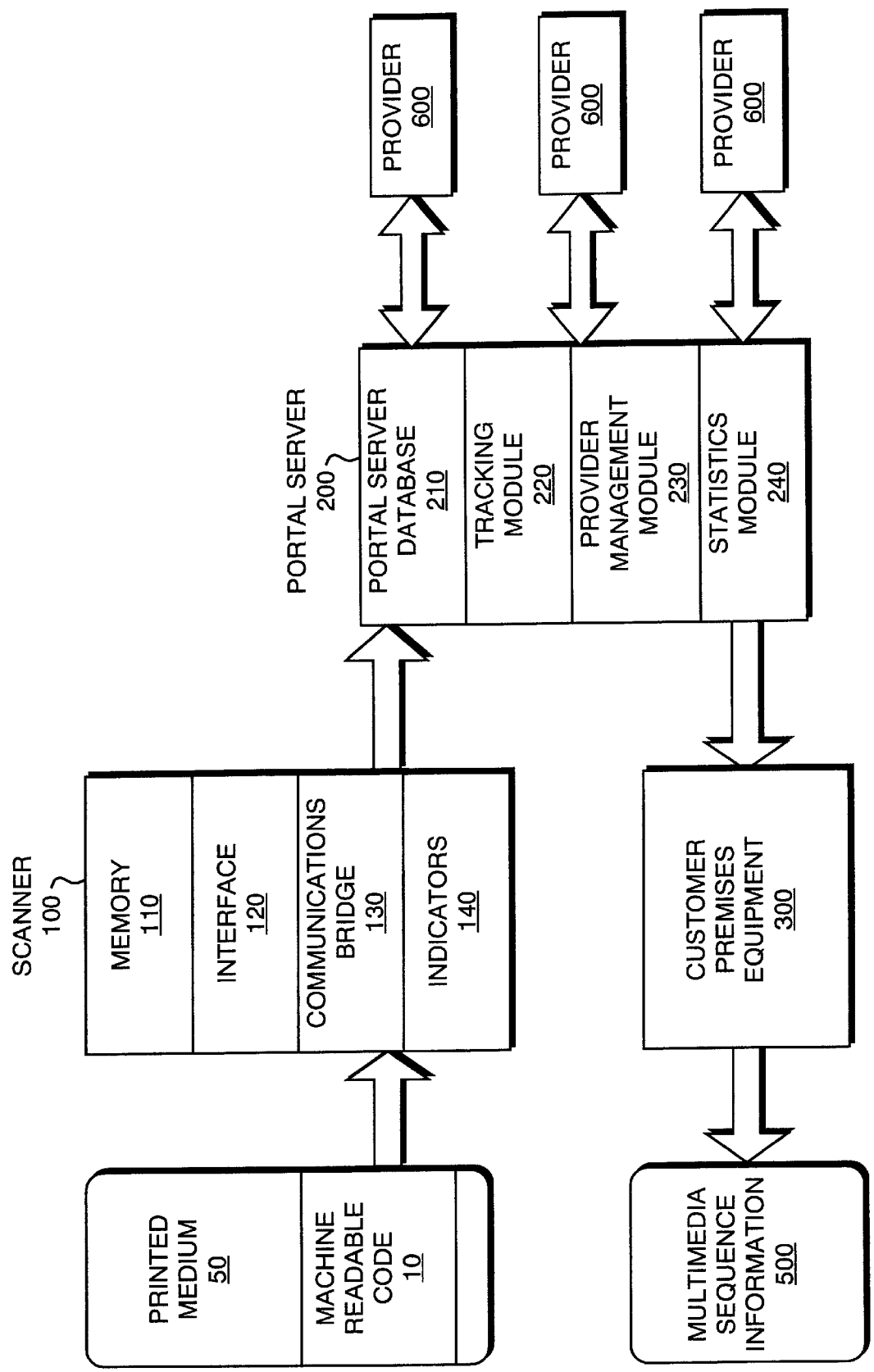
FIG. 2 depicts an embodiment of the present invention wherein the scanner communicates with a portal server directly without a receiver.
Figure 3:
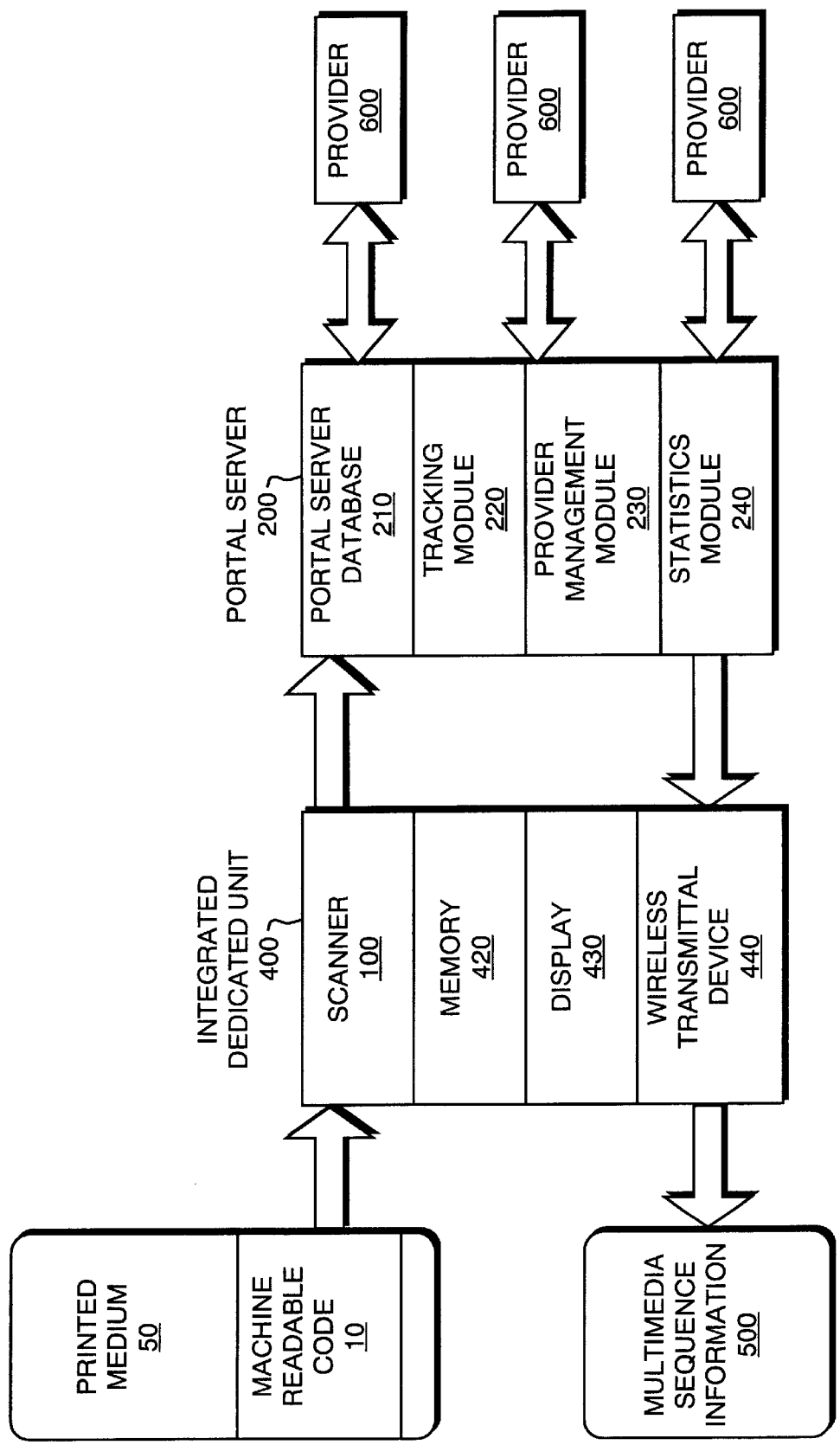
FIG. 3 depicts an embodiment of the present invention wherein the scanner and the customer premises equipment are integrated into one device.
Figure 4:
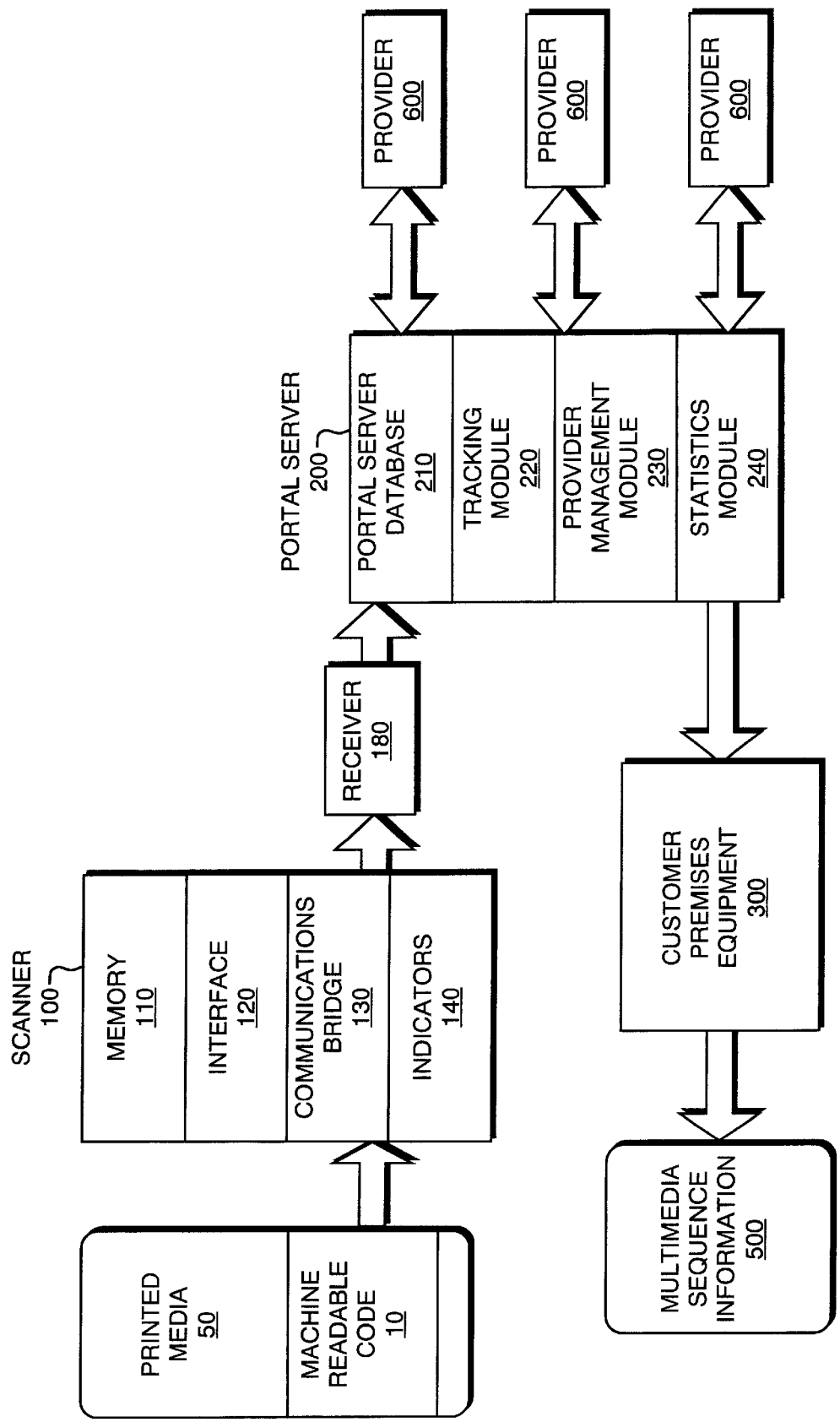
FIG. 4 depicts an embodiment of the present invention wherein the a customer premises equipment is separate from the receiver and the scanner.

FIG. 3 depicts an embodiment in which the scanner 100 is part of an integrated dedicated unit 400 which includes a memory 420, a microprocessor (not shown), stored templates containing the link and cookie information (not shown), a display 430, a cable (not shown), and a wireless transmitting device 440, such as infrared, visual or radio frequency. The dedicated unit 400 could contain any subset of these components or include other components as depicted in FIGS. 2 and 4.

The system of the invention enables scanning of encoded information from the embedded codes 10 and uploading these codes to the portal server 200 for immediate or delayed processing or for reference. The system is capable of allowing print advertisers to track their impressions to execution and to collect demographic information about the person performing the scan through a tracking module 220,. The tracking module 220 is illustrated in FIG. 1 as part of the portal server 200, however, it may reside in any of the 100, 180, 400, 300, 200, or 600 components of the system. The tracking module 220 is further capable of tracking the transaction value of e-commerce transactions originating from a specific publication, type of publication, or provider 600 and calculate fee percentages based on the transaction. For example, in one embodiment, the scanner 100 comprises a clock capable of tracking the time the ad was scanned. In an embodiment where scanner 100 is a GPS, the geographical location where the scan occurred may also be tracked. The system also contemplates transmitting bio-metric information according and to the extent permitted by the user personal profile information. The combination of all tracking information comprises ad read-scan context information which may be transmitted to the portal server 200 or to the provider 600 according to and to the extent permitted by the user personal profile information.

The receiver 180 of the present invention is in communication with the scanner 100, and portal server 200 via wire, or through wireless technology such as infrared, light based transmission, radio frequency, or satellite. The receiver 180 could be incorporated into or be a computer, a cell phone, a pager, a remote control, a personal digital assistant, a simple buffer, or use a direct link. The receiver 180 could also be incorporated into existing devices such as a television, a set top box, a Web TV device, a VCR, a Digital Versatile Disc ("DVD") player, an appliance, a customer premises equipment ("CPE") 300, or any other electronic device. The receiver 180 may, but not necessarily, collect, sort and prioritize the transmissions of link and user input information. The receiver 180 could queue up these transmissions or process them immediately. The receiver 180 could also contain at least one cookie, and received time information, as well as other information including receiver or provider specific information.

In one embodiment, the receiver 180 forwards the raw scanned codes 10 directly to the portal server 200 or other site such as a provider 600 via a portal server 200. In another embodiment, the receiver 180 collects, stores, processes, and forwards the scanned code information along with the cookie and other state dependant information, such as time, temperature, and location, to the network.

The receiver 180 may be multi-functional and include multiple inputs such as radio frequency and infrared. The receiver 180 may also incorporate X-10, wireless, wired, and power-line networking to link to multiple units or, for larger installations, at least one repeater. The receiver 180 may also incorporate wireless, wire-line, or power-line links to at least one local computer or CPE 300.

In embodiments shown in FIGS. 2 and 4, the CPE 300 may function as a queue processor or pre-processor. Also a user may enter information using the CPE 300, including user personal profile information. In another embodiment, scanned codes 10 are processed by the CPE 300 according to user preferences. By way of example, the CPE 300 could process the codes 10 automatically and sequentially as the codes 10 are received, or store the codes 10 in a queue to be processed at the convenience of the user. Cookies may be stored on one or more of the CPE 300, the scanner 100, and the receiver 180. The CPE 300 receives the scanned code 10, including the link information from scanner 100, and transmits the code 10 to the portal server 200. The portal server 200 resolves the link information and sets up a path from a location on the network, such as a specific web address, Internet site, or provider 600 location, to the receiver 180. The location sends information, such as multimedia information sequences 500, along the path to the receiver 180 for display and playback.

The system of the present invention contemplates at least one portal server 200. The portal server 200 may be a single site or multiple sites. The portal server 200 is in communication with the scanner 100 and the receiver 180 via the network and centrally manages, assigns, and controls the codes 10, code types and information from the printed media 50. The portal server 200 is capable of receiving the link information and the user input information, selecting a multimedia information sequence 500 corresponding to the link information and the user input information, and sending the multimedia information sequence 500 via the network to the receiver 180.

One advantage of the system is the minimal amount of information needed to be scanned to link to a specific location when using a link information database including cookies at the portal server 200. The portal server 200 processes code 10 which may contain levels of embedded information, and references information, such as database information provided by providers 600, advertisers, and information providers. The information contained in scanned code 10 may be combined with at least one of the user input information, the cookie, state dependant information, ad read-scan context information and other transmitted information to link the portal server 200 to at least one location on the network and complete a transaction, such as a request for information or an e-commerce transaction.

In one embodiment, the portal server 200 is adapted to receive and process requests from a user who provides the portal server 200 with raw code 10 through a communications device such as a keyboard, a telephone, a voice activated system, or a modem. In this embodiment, a user can initiate the interactive communication of multimedia information without using scanner 100. In a further embodiment, the scanner 100 may access the portal server via a telephone dial system. For example, after scanning, a user may use a telephone to communicate the scanner 100 to the network. Once data has been transferred, the user may use a voice menu system to control the remainder of the transaction, such as the receipt of sound only multimedia information, or engaging in a transaction. In another embodiment, the portal server 200 has a single common database of links for print and electronic transactions. The database of links may be accessed by users of the system, such as advertisers, print media owners, and information providers 600.

A tracking module 220 in the portal server 200 can track link information corresponding to a user, such as a universal resource locator, an Internet address information, a trademark information, a source of origin, an organization name, a product name, a service name, a benefit redemption information, a provider defined information, a user personal profile information, a user interest information, a server command information, and a customer premises equipment preference information.

The tracking module 220 is also capable of tracking fees associated with every ad and every transaction originating on the network via the portal server 200. Fees may be based on, for example, the selected multimedia information sequence, the number and frequency of the link information received by the portal server corresponding to a particular information provider, or the transaction value in the event the selected multimedia information sequence generates a transaction. The fee tracking module 220 can track fees relating to at least one e-commerce transaction originating from the scan.

A provider management module 230 and a statistics module 240 in the portal server 200 maintain advertising information and transactions generated from the providers 600 that originate independent of a scan based on user personal profile information. Thus, the invention allows advertisers to broadcast to users of the portal server 200 according to the user personal profile information or portal server configuration. The provider management module 230 is capable of providing feed back to the providers regarding the effectiveness of the provider's printed media 50, and allows for flexible, real-time message tuning.

An indigraphics module (not shown) in the portal server 200 performs user personal profile information management functions, such as marking and publishing auction oriented information based on the user personal profile and interest information.

A funds management module (not shown) in the portal server 200 manages and facilitates fund transactions between users of the system. The funds management module processes information from the other modules in the portal server 200, such as the tracking module 220. Preferably, the funds management module uses a form of electronic funds transfer, such as Ecash, to accept and distribute funds according to information received form the tracking module 220.

For example, according to the invention a person can scan an ordinary black and white car ad placed in a newspaper by a local dealer that is enhanced with code 10. Shortly thereafter, the person experiences a full-featured multimedia presentation related to the car ad on the person's Web TV or computer. The tracking module 220 calculates a fee to be shared between the manufacturer, the dealer, and the person buying the car based on a percentage of the sale. The funds management module can accept Ecash from the person and either distribute it to all parties involved in the transaction or store the information as debits and credits in an account database.

In another example of the invention, a person can go to the grocery store and scan UPC codes 10 off items and check the nutrition information or recipes at the end of the aisle in a kiosk with or without a printer. Alternatively, the person can take the UPC information home and upload it to their receiver 180 or a CPE, and get information on the product, a coupon, or other benefit redemption information. The store could optionally provide a link to the net so the user could upload the information to his home computer from the store via the Internet connection.

In another example of the invention, stuffed animals could be linked to a location on the network by using a scanner 100. The scanner 100, according to this example can be a proximity-based device, such as a smart button (like those in Java rings), or almost any other kind of device including security cards and access devices.

In another example, a person can scan a 5 year old computer monitor on the person's desk and be immediately routed to a web page that offers a list of local service centers for the monitor or technical information about the monitor, such as schematics, instruction manuals, or warranty manuals. The transaction could also result in the person receiving a rebate offer, a trade-in offer, or recall and safety information. The invention enables manufacturers to maintain contact with customers for extended periods of time beyond the traditional period of time manufacturers and customers interact. The contact enables the manufacturer to collect product usage information that was traditionally inaccessible. Manufacturers could also use incentive programs to get people to scan their products.

The invention provides for allowing the information providers 600 to electronically receive codes 10 to embed in the advertisements. It also allows the publishers of the advertisements, such as newspaper and magazine companies, to print their own ad codes and share this information with the portal server 200. The invention contemplates using an enhanced code in the ads containing information on the identity of the publication and the product. The system enables the publishers to share in the flow-through profits of a transaction even though they may not provide any products. The system further enables simple marketers and catalogue providers to operate with reduced infrastructure by including information in the code 10 which points to portal-operated e-commerce stores or to the manufacturer/distributor's e-commerce store.

Reprints of copyrighted material could also be a service the portal server 200 provides to authors. Authors may embed a code 10 in their book or article. A user scanning the code 10 could receive a copy of the entire article or related articles or books or information for an appropriate fee. The invention provides authors with an inexpensive method for collecting fees that are typically very small. A copyright service portal server could credit the author's account by pennies or even fractions of pennies per downloaded page via an existing e-commerce service or another portal server. Fees associated with accessing and downloading moderately and expensively priced items, such as CDs and newsletters, can be handled in a similar fashion.

The invention further contemplates setting up medical testing devices to operate with the system. A body monitor capable of tracking medical information regarding the person's then existing medical condition could communicate this information periodically or when a parameter is so indicated or satisfied. The system of the invention features the ability to combine wired and wireless raw data with user input, state information, and cookie information, at the portal server 200. The portal server 200 directs and channels the information based on the user personal profile information. The base information could be a code that is scanned or is embedded in a device that adds the base information to information collected by the body monitor. The link at the portal server 200 may be dynamically moved and a new version of the body monitor's embedded code or a new set of parameters may be downloaded from a location on the network.

The invention also contemplates using the system to collect alarm and appliance information from household items. The system includes a central receiver capable of receiving radio frequency or infrared signals. A raw data stream, pointer information, and state information may be transmitted from the household item to the receiver. The receiver communicates the information to the portal server. The portal server can combine the information with a cookie and use the pointer information to securely send it to the manufacturer's web site.

The system of the invention has several modes of operation, including collect and store, collect and execute, and collect and process then execute. The user sets the mode according to the user personal profile information. The user interface of the scanner, settings on the receiver and software settings on the CPE 300 or the portal server 200 may also be combined with the user personal profile information to set the mode.

Existing remote control devices such as television remote controls can be modified to scan and transmit the code 10 to a receiver 180 such as a set top box. In one embodiment, the code 10 would be scanned and embedded after a specific sequence of standard codes that could be stripped out by the receiver 180. For example, in collect and store mode, pressing a predetermined sequence of buttons on a remote control will activate the scan mode of the remote. Once activated, the remote control can be used to collect and store a code 10 from a magazine advertisement, for example. The user would then point the remote at the set top box and depress a single key or sequence of keys to transmit the code information.

Information such as multi-media information sequences 500, may be transmitted to a CPE 300, or any other receiver 180 connected to the network. The receiver 180 and a local CPE 300 could be combined into a single unit. The receiver 180 could be a dumb or smart device, embedded or stand alone. The CPE could be a PC or could be omitted or replaced by online processing or by a Web TV. The receiver 180 and scanner 100 of the invention can be combined and included as part of an enhanced WebTV.

The present invention may be embodied in other specific forms without departing from the spirit or essential attributes thereof and, accordingly, reference should be made to the appended claims, rather than to the foregoing specification, as indicating the scope of the invention.

What is claimed is:

1. A system for communicating text information via a network by initiating a communication from a printed medium containing content information associated with a party sponsoring link information on a portal server, the system comprising:

a network;

a first receiver that receives data conveyed by the printed medium, the data comprising the link information associated with the content information, the first receiver comprising:

a memory;

a user interface for receiving user input information, the user input information capable of being stored in the memory; and a communications bridge in communication with the network;

a second receiver in communication with the first receiver, the second receiver capable of receiving and communicating the link information and the user input information via the network and receiving and conveying the text information;

wherein the portal server is in communication with the first receiver and with the second receiver via the network, and is capable of receiving the link information and the user input information, selecting the text information corresponding to the link information and the user input information, and transmitting the text information via the network to the second receiver.

2. The system according to claim 1 wherein the first and second receivers are integrated into a single device.

3. The system according to claim 1 wherein the user interface comprises at least one of a voice activated system, a keypad, or a keyboard.

4. The system according to claim 1 wherein the first receiver comprises a proximity-based device.

5. A system for communicating audio information via a network by initiating a communication from a printed medium containing content information associated with a party sponsoring link information on a portal server, the system comprising:

a network;

a first receiver that receives data conveyed by the printed medium, the data comprising the link information associated with the content information, the first receiver comprising:
a memory;
a user interface for receiving user input information, the user input information capable of being stored in the memory; and
a communications bridge in communication with the network;
a second receiver in communication with the first receiver, the second receiver capable of receiving and communicating the link information and the user input information via the network and receiving and conveying the audio information;
wherein the portal server is in communication with the first receiver and with the second receiver via the network, and is capable of receiving the link information and the user input information, selecting the audio information corresponding to the link information and the user input information, and transmitting the audio information via the network to the second receiver.

6. The system according to claim 5 wherein the first and second receivers are integrated into a single device.

7. The system according to claim 5 wherein the user interface comprises at least one of a voice activated system, a keypad, or a keyboard.

8. The system according to claim 5 wherein the first receiver comprises a proximity-based device.

9. A system for communicating video information via a network by initiating a communication from a printed medium containing content information associated with a party sponsoring link information on a portal server, the system comprising:
a network;
a first receiver that receives data conveyed by the printed medium, the data comprising the link information associated with the content information, the first receiver comprising:
a memory;
a user interface for receiving user input information, the user input information capable of being stored in the memory; and
a communications bridge in communication with the network;
a second receiver in communication with the first receiver, the second receiver capable of receiving and communicating the link information and the user input information via the network and receiving and conveying the video information;
wherein the portal server is in communication with the first receiver and with the second receiver via the network, and is capable of receiving the link information and the user input information, selecting the video information corresponding to the link information and the user input information, and transmitting the video information via the network to the second receiver.

10. The system according to claim 9 wherein the first and second receivers are integrated into a single device.

11. The system according to claim 9 wherein the user interface comprises at least one of a voice activated system, a keypad, or a keyboard.

12. The system according to claim 9 wherein the first receiver comprises a proximity-based device.

13. A system for communicating text information via a network by initiating a communication from a printed medium containing content information associated with a party sponsoring link information on a portal server, the system comprising:
a network;
a first receiver that receives data conveyed by the printed medium, the data comprising the link information associated with the content information, the first receiver comprising:
a user interface for receiving user input information; and
a communications bridge in communication with the network;
a second receiver in communication with the first receiver, the second receiver capable of receiving and communicating the link information and the user input information via the network and receiving and conveying the text information;
wherein the portal server is in communication with the first receiver and with the second receiver via the network, and is capable of receiving the link information and the user input information, selecting the text information corresponding to the link information and the user input information, and transmitting the text information via the network to the second receiver.

14. The system according to claim 13 wherein the first receiver comprises a telephone system.

15. The system according to claim 13 wherein the portal server comprises a voice recognition system.

16. A system for communicating audio information via a network by initiating a communication from a printed medium containing content information associated with a party sponsoring link information on a portal server, the system comprising:
a network;
a first receiver that receives data conveyed by the printed medium, the data comprising the link information associated with the content information, the first receiver comprising:
a user interface for receiving user input information; and
a communications bridge in communication with the network;
a second receiver in communication with the first receiver, the second receiver capable of receiving and communicating the link information and the user input information via the network and receiving and conveying the audio information;
wherein the portal server is in communication with the first receiver and with the second receiver via the network, and is capable of receiving the link information and the user input information, selecting the audio information corresponding to the link information and the user input information, and transmitting the audio information via the network to the second receiver.

17. The system according to claim 16 wherein the first receiver comprises a telephone system.

18. The system according to claim 16 wherein the portal server comprises a voice recognition system.

19. A system for communicating video information via a network by initiating a communication from a printed medium containing content information associated with a party sponsoring link information on a portal server, the system comprising:
a network;
a first receiver that receives data conveyed by the printed medium, the data comprising the link information associated with the content information, the first receiver comprising:
a user interface for receiving user input information; and a communications bridge in communication with the network;

a second receiver in communication with the first receiver, the second receiver capable of receiving and communicating the link information and the user input information via the network and receiving and conveying the video information;

wherein the portal server is in communication with the first receiver and with the second receiver via the network, and is capable of receiving the link information and the user input information, selecting the video information corresponding to the link information and the user input information, and transmitting the video information via the network to the second receiver.

20. The system according to claim 19 wherein the first receiver comprises a telephone system.

21. The system according to claim 19 wherein the portal server comprises a voice recognition system.

* * * * *